United States Patent
Nagamura

(10) Patent No.: US 7,978,958 B2
(45) Date of Patent: Jul. 12, 2011

(54) PICTURE AND AUDIO RECORDING APPARATUS AND HARD DISK RECORDER

(75) Inventor: Yoshihisa Nagamura, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1140 days.

(21) Appl. No.: 11/727,742

(22) Filed: Mar. 28, 2007

(65) Prior Publication Data
US 2007/0230912 A1 Oct. 4, 2007

(30) Foreign Application Priority Data
Mar. 28, 2006 (JP) .................. 2006-087025

(51) Int. Cl.
*H04N 5/76* (2006.01)
(52) U.S. Cl. ........................ 386/292; 386/295
(58) Field of Classification Search ................. 386/292, 386/295, 239, 294, 326, 351
See application file for complete search history.

(56) References Cited

U.S. PATENT DOCUMENTS
2003/0147629 A1* 8/2003 Kikuchi et al. ................. 386/69
2009/0297117 A1* 12/2009 Komi et al. ..................... 386/46

FOREIGN PATENT DOCUMENTS
JP A-2004-128779 4/2004
JP A-2004-342272 12/2004
JP A-2005-051493 2/2005

* cited by examiner

*Primary Examiner* — Robert Chevalier
(74) *Attorney, Agent, or Firm* — Morgan, Lewis & Bockius LLP

(57) ABSTRACT

A picture and audio recording apparatus that manages record positions of contents by using a management table, saves only one contents among overlapping contents recorded on a recording medium and erases other overlapping contents; stores information about which one of saved contents is the same as the erased contents in a management table; and looks up the management table for reproducing the same contents that are recorded when reproduction of the erased contents is instructed.

3 Claims, 3 Drawing Sheets

PICTURE AND AUDIO RECORDING APPARATUS AND HARD DISK RECORDER

This application is based on Japanese Patent Application No. 2006-087025 filed on Mar. 28, 2006, the contents of which are hereby incorporated by reference.

BACKGROUND OF THE INVENTION

1. Field of the Invention

The present invention relates to a picture and audio recording apparatus and a hard disk recorder for recording picture information of a TV program or the like on a recording medium.

2. Description of Related Art

As the picture and audio recording apparatus for a use of recording a TV program at home, there are a video cassette recorder, an optical disc apparatus such as a DVD recorder and a hard disk recorder. There is also a multiple function apparatus that is equipped with the functions thereof built in a single enclosure, e.g., an optical disc apparatus with an integrated hard disk drive.

In particular, a picture and audio recording apparatus equipped with a large capacity recording medium such as a hard disk is used for recording broadcasting programs of one or more channels continuously by taking advantage of its large capacity. In this way, a user can watch only desired programs among recorded programs without missing the desired programs. However, since a lot of undesired programs are stored on the recording medium, there may be not enough free space on it. Therefore, it is necessary to record efficiently.

For example, JP-A-2005-51493 discloses an automatic erasing mode in which if there is a program recorded on the hard disk drive having the same title as a program to be watched from that time, the recorded program is automatically erased.

In addition, JP-A-2004-342272 discloses an information recording apparatus that records only one of a plurality of information sources if they have the same contents and even if file names of them are not the same.

In addition, JP-A-2004-128779 discloses a recording apparatus that overwrites contents if the same classification code is added to them, so that only most newly recorded contents are saved in a hard disk.

According to the technique disclosed in JP-A-2005-51493, a program that has little possibility of being watched is removed from the hard disk. However, there is a case where news programs or the like may have the same title and different contents, so they should not be erased.

In addition, according to the technique disclosed in JP-A-2004-342272, usability of picture data collected by the user may be improved. However, the function of the information recording apparatus does not work unless the user does registration and selection actively.

In addition, in a case of the technique disclosed in JP-A-2004-128779, the function is integrated with a broadcasting system, support of a broadcasting station is necessary.

In this way, there is a risk of erasing a necessary data when a user intends to erase an unnecessary data by automatic operation. On the other hand, there is a problem that erasing unnecessary data manually takes time and efforts with bad usability.

SUMMARY OF THE INVENTION

In view of the above described problem it is an object of the present invention is to provide a picture and audio recording apparatus and a hard disk recorder that can record a lot of programs by increasing free space on a recording medium while keeping a state where all the recorded programs can be watched.

To attain the above described object, a picture and audio recording apparatus that manages record positions of contents by using a management table in accordance one aspect of the present invention is characterized by a structure in which the picture and audio recording apparatus saves only one contents among overlapping contents recorded on a recording medium and erases other overlapping contents; the picture and audio recording apparatus stores information about which one of saved contents is the same as the erased contents in a management table; and the picture and audio recording apparatus looks up the management table for reproducing the same contents that are recorded when reproduction of the erased contents is instructed.

According to this structure, overlapping contents recorded on a recording medium are erased except for saved one of them.

In accordance with another aspect of the present invention, the picture and audio recording apparatus which has the above described first structure is characterized by a structure in which the erasing is performed for a unit of title.

To attain the above described object, a hard disk recorder that manages record positions of contents by using a management table in accordance with other aspect of the present invention is characterized by a structure in which the hard disk recorder saves only one title among overlapping title recorded on a recording medium and erases other overlapping title; the hard disk recorder stores information about which one of saved title is the same as the erased title in a management table; and the hard disk recorder looks up the management table for reproducing the same title that are recorded when reproduction of the erased title is instructed.

According to the present invention, overlapping contents recorded on a recording medium are erased, and the management table is rewritten. Therefore, a lot of programs can be recorded by increasing free space on a recording medium while keeping the state where all the recorded programs can be watched.

DETAILED DESCRIPTION OF THE PREFERRED EMBODIMENTS

Figure 1:
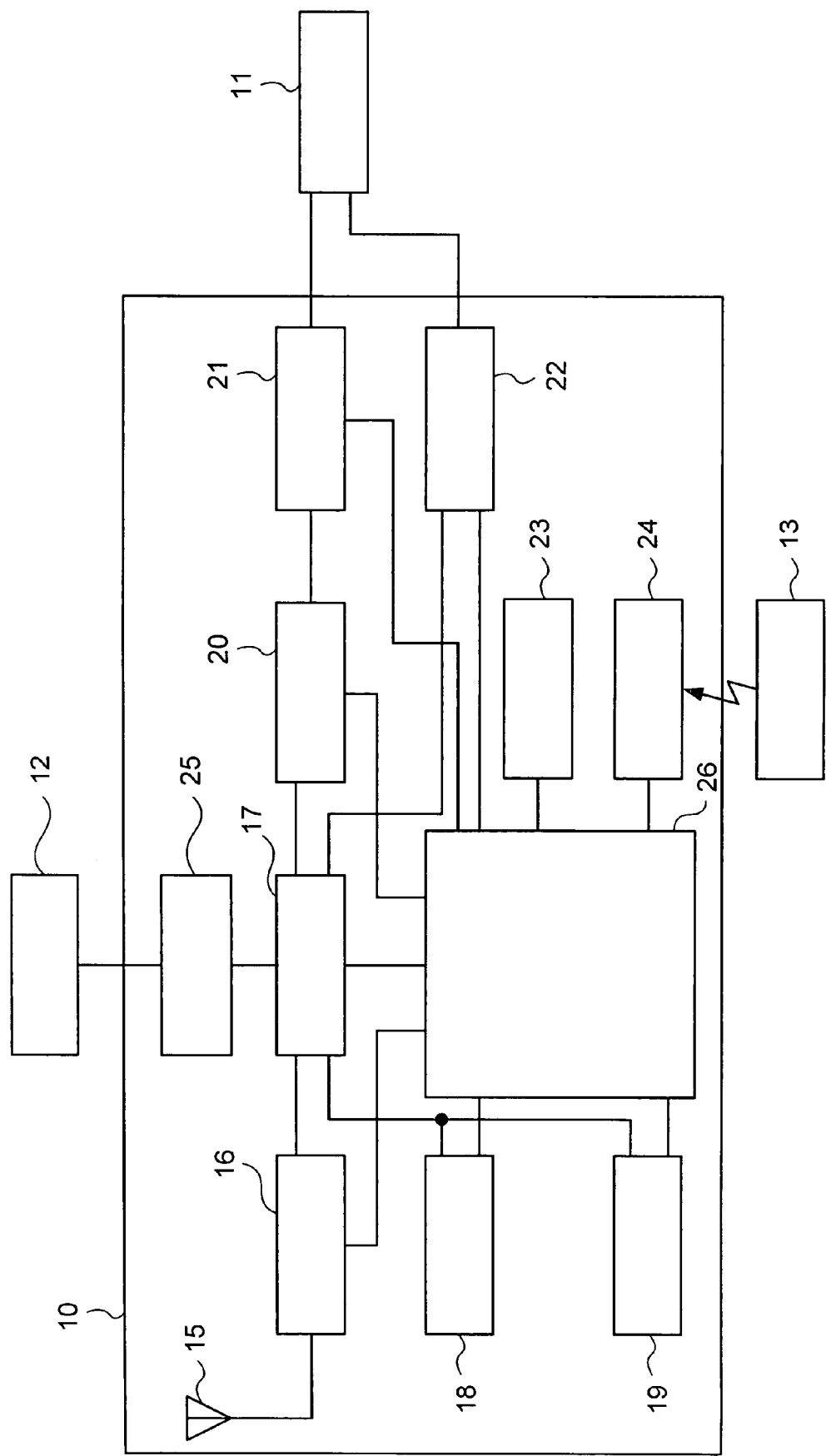
FIG. 1 is a block diagram to show a structure of an optical disc apparatus with an integrated HDD and peripheral equipment thereof.

Hereinafter, an embodiment of the present invention will be described by using an optical disc apparatus with an integrated hard disk drive (HDD) as one example of a picture and audio recording apparatus. FIG. 1 is a block diagram to show a structure of an optical disc apparatus with an integrated HDD 10 and peripheral equipment thereof. The optical disc apparatus with an integrated HDD 10 is connected to a display device 11 such as a TV set and an external device 12 that is represented by a picture and audio recording apparatus such as a set top box of CATV, satellite broadcasting or the like, a video deck or the like. In addition, the optical disc apparatus with an integrated HDD 10 can be operated by using a remote controller 13. In the following description, a DVD will be exemplified as the optical disc.

The optical disc apparatus with an integrated HDD 10 includes an antenna 15 that receives TV broadcasting signals, a tuner 16 that demodulates and digitizes the TV broadcasting signal received by the antenna 15, an image and audio compression and expansion portion 17 that compresses and encodes an image and audio data received from the tuner 16 or the external device 12 in accordance with MPEG2 or the like as well as expands and decodes the compressed image data that is reproduced by a HDD recording and reproducing portion 18 or a DVD recording and reproducing portion 19, the HDD recording and reproducing portion 18 that records in the HDD the compressed image and audio data that is received from the image and audio compression and expansion portion 17 and reproduces data recorded in the HDD, the DVD recording and reproducing portion 19 that records on a loaded DVD the compressed image and audio data that is received from the image and audio compression and expansion portion 17 and reproduces data recorded on a DVD, an on-screen display (OSD) portion 20 that displays various setting values on a part of the display device 11 so that the setting values can be set, an image output portion 21 that converts an image signal from the OSD portion 20 into an analog signal and supplies it to the display device 11, an audio output portion 22 that converts an audio signal from the image and audio compression and expansion portion 17 into an analog signal and supplies it to the display device, a memory 23 made up of a ROM and a RAM, a remote controller receiving portion 24 that receives a signal from the remote controller 13, an external interface (I/F) 25 that is connected to the external device 12, and a control portion 26 that controls the individual portions of the optical disc apparatus with an integrated HDD 10.

In addition, the control portion 26 performs control for increasing free space on a recording medium while keeping the state where all the recorded programs can be watched. This operation will be described in detail below.

Figure 2:
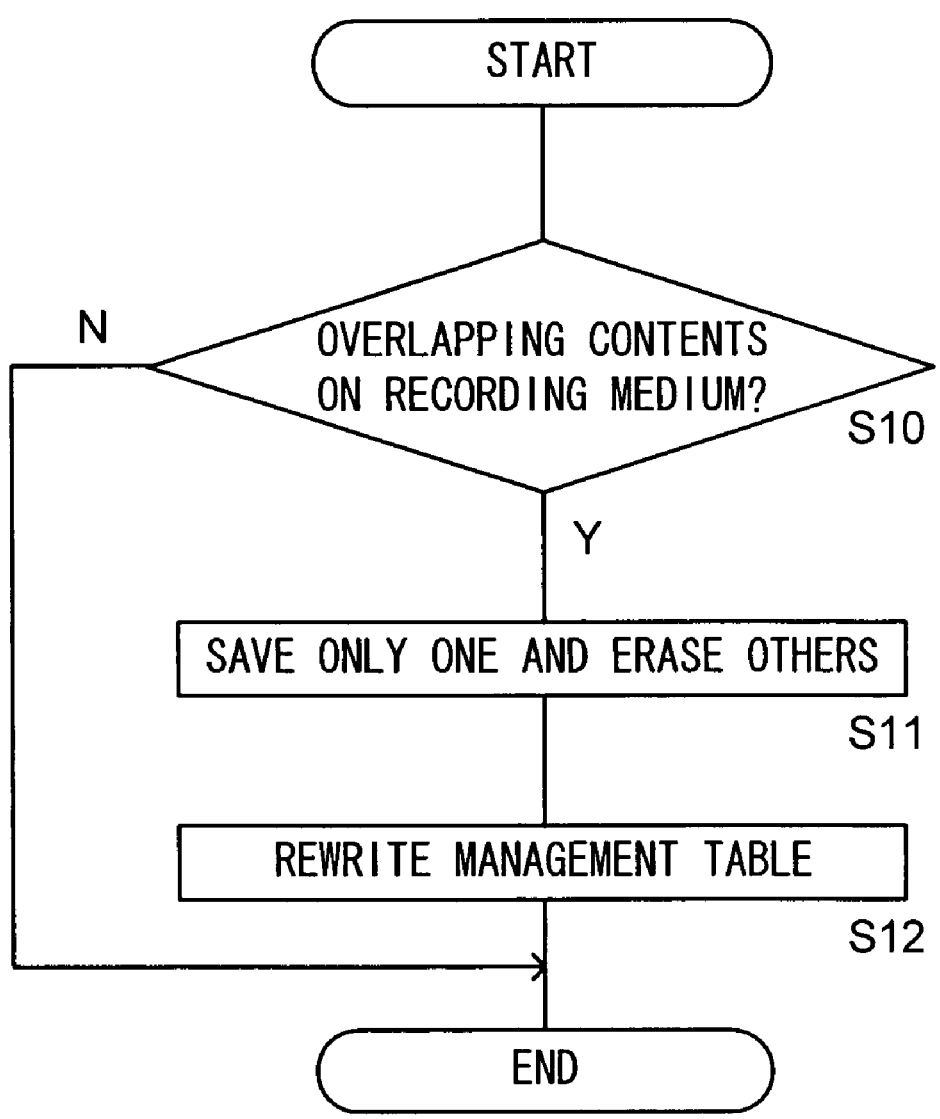
FIG. 2 is a flowchart to show one example of an operation of the optical disc apparatus with an integrated HDD.

FIG. 2 is a flowchart to show one example of an operation of the optical disc apparatus with an integrated HDD 10. In the step S10, the control portion 26 determined whether or not there are overlapping contents stored in the recording medium. It may be determined as to overlapping within either the HDD or the DVD, or it may be determined as to overlapping in the total storage of the HDD and the DVD.

The term "contents" means pictures and sounds recorded on a recording medium. Furthermore, the determination whether or not there are overlapping contents can be performed by comparing the pictures and/or sounds by a predetermined unit. The term "predetermined unit" means, for example, a unit of title, a unit of chapter, a unit of frame, or other unit that can split the contents. If the apparatus can receive an electronic program guide (EPG), it is possible to assign a title to every program. Even if the apparatus cannot receive the EPG, it is possible to assign a title to a program at a set interval of time which is set by a user.

In addition, the comparison between pictures or sounds can be performed by various conventional methods such as a method of comparing pictures with each other by a micro block unit. If they are substantially the same even if they don't match completely, it is determined that they are overlapping contents. It is because that presence or absence of a time display on a screen or TV commercials may be different in a case of a rebroadcasting program, for example.

According to this determination, if the contents are compared with each other by a unit of title or a unit of chapter, it is decided that the rebroadcasting programs are overlapped. In addition, if the contents are compared with each other by a unit of frame, it is determined that the same TV commercials or the same scenes are overlapped.

At this point, the step S10 is performed at a timing except a reproducing period, and the timing may be during a recording period. In this case, it is preferable to perform it every one hour or at the end of the program so that determination of overlapping by a unit of title can be performed easily.

In the step S10, if there are overlapping contents, the process goes to the step S11, where only one of the overlapping contents is kept while other overlapping contents are erased. Thus, rebroadcasting programs and the same TV commercials are removed, so that free space on the recording medium is increased. Furthermore, as the unit of comparison of contents is smaller, the overlapping contents become the larger, so that quantity of erasable data as well as free space is increased. On the contrary, if there are no overlapping contents in the step S10, the process is finished.

In the step S12 after the step S11, the management table is rewritten. The management table is a table that describes record positions of contents, which is stored in the memory 23, for example. When information is reproduced, the management table is looked up for checking which position on the recording medium the desired contents are written. At this point, rewriting of the management table is performed by rewriting the record position of the contents that were erased in the step S11 with the record position of the same contents that were kept. Thus, it is checked whether the erased contents are the same as the contents that were kept.

Figure 3:
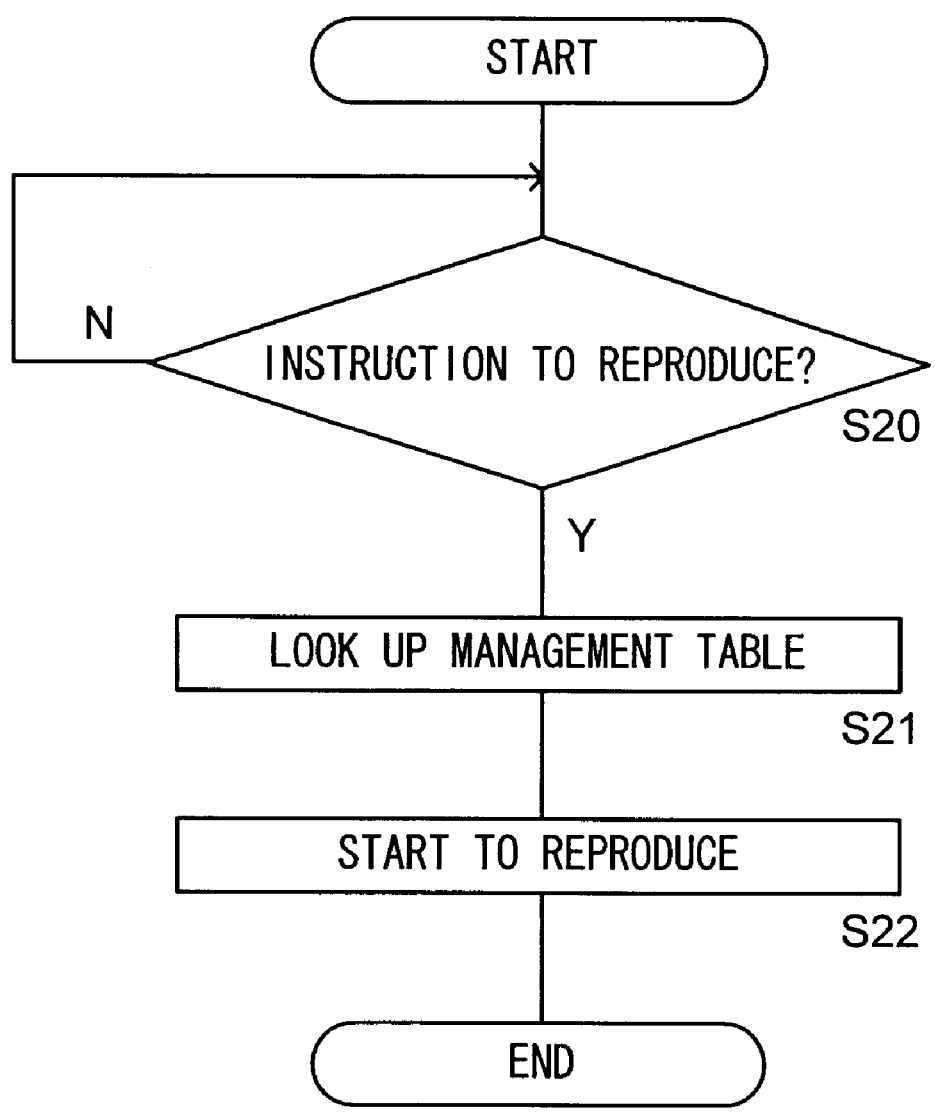
FIG. 3 is a flowchart to show another example of an operation of the optical disc apparatus with an integrated HDD.

Next, reproduction of the contents will be described. FIG. 3 is a flowchart to show one example of an operation of the optical disc apparatus with an integrated HDD 10. First in the step S20, it is determined whether or not there was an instruction to reproduce any one of the contents. If there was an instruction to reproduce in the step S20, the process goes to the step S21 where the management table is looked up for checking the record position of the contents that are to be reproduced according to the instruction. In this case, since the record position of even the contents that were erased as overlapping contents is rewritten into the record position of the same contents in the step S12, the process goes to the step S22 where the other same contents are reproduced. According to this arrangement, even as to a program that was erased as an overlapping program, a user can watch a program of the same contents without being aware of it.

According to the embodiment described above, since the overlapping contents are erased while the management table is rewritten, it is possible to increase free space on a recording medium for recording a lot of programs while keeping the state where all the recorded programs can be watched.

Hereinafter, one example that is more concrete than the embodiment described above will be described. For example, in a case where one channel of broadcasting program is being recorded continuously in the HDD, when recording of one title is finished, it is determined whether or not there is another title having the contents overlapping with the contents of the title in the HDD by comparing the pictures. As a result, if there are overlapping titles in the HDD due to any reason of rebroadcasting or the like, the title that was recorded most recently is erased. Furthermore, the record position corresponding to the erased title in the management table is rewritten into the record position of the same title that was recorded before.

After that, when there is an instruction to reproduce the erased title, the management table is looked up so that the record position of the title to be reproduced in accordance with the instruction is checked for reproducing it. In this case, it is reproduced in the same manner as a normal reproduction, so a user can watch the program without being aware of it.

The present invention can be utilized for a picture and audio recording apparatus such as a video cassette recorder, an optical disc apparatus like a DVD recorder or a hard disk recorder, or a multiple function apparatus equipped with a plurality of picture and audio recording apparatuses in a single enclosure, e.g., an optical disc apparatus with an integrated hard disk drive or the like.

What is claimed is:

1. A picture and audio recording apparatus that manages record positions of contents by using a management table, wherein
   the picture and audio recording apparatus saves only one contents among overlapping contents recorded on a recording medium and erases other overlapping contents;
   the picture and audio recording apparatus stores information about which one of saved contents is the same as the erased contents in a management table; and
   the picture and audio recording apparatus looks up the management table for reproducing the same contents that are recorded when reproduction of the erased contents is instructed.

2. The picture and audio recording apparatus according to claim 1, wherein the erasing is performed for a unit of title.

3. A hard disk recorder that manages record positions of contents by using a management table, wherein
   the hard disk recorder saves only one title among overlapping title recorded on a recording medium and erases other overlapping title;
   the hard disk recorder stores information about which one of saved title is the same as the erased title in a management table; and
   the hard disk recorder looks up the management table for reproducing the same title that are recorded when reproduction of the erased title is instructed.

* * * * *